April 4, 1961
W. A. ZISMAN ET AL
2,977,748
LUBRICATED WIRE ROPE
Filed May 18, 1955
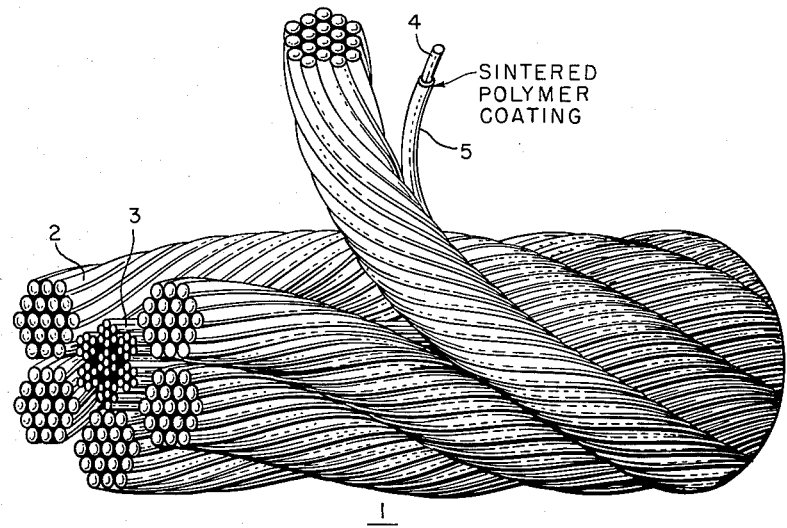
INVENTORS
WILLIAM A. ZISMAN
VINCENT G. FITZSIMMONS
BY
ATTORNEYS

United States Patent Office 2,977,748
Patented Apr. 4, 1961

2,977,748

LUBRICATED WIRE ROPE

William A. Zisman, Silver Spring, Md., and Vincent G. FitzSimmons, Washington, D.C.

Filed May 18, 1955, Ser. No. 509,435

8 Claims. (Cl. 57—149)

(Granted under Title 35, U.S. Code (1952), sec. 266)

The invention described herein may be manufactured and used by or for the Government of the United States of America for governmental purposes without the payment of any royalties thereon or therefor.

This invention relates to the lubrication of wire rope, more particularly to new lubricated wire rope.

Wire rope is commonly of a construction in which a plurality of steel multiwire strands are laid about a core. The individual wires are customarily coated with a lubricant prior to the twisting or stranding operation, to better provide for lubrication of the wires in the interior of the rope. In view of the importance of lubrication in the maintenance of wire rope, it is highly desirable to provide as initial lubricant on the wires, one which is both durable and effective for a wide variety of working conditions, since thereby relubrication and its problems are greatly reduced, if not eliminated.

We have found that improved ferrous wire rope in which the individual wires are provided with a lubricant which is both durable and effective for a wide variety of operating conditions can be obtained by coating the individual wires before forming them into strands with a plural layer thin film of sintered polytetrafluoroethylene. Polytetrafluoroethylene is a polymer sold under the trade name Teflon. Effective thicknesses for the plural layer thin film of sintered polymer on the wires can be on the order of from about 0.1 to 1 mil, with a preferred range of thicknesses therefor being from about 0.3 to 0.5 mil. The thin plural layer film of sintered polymer, as a practical matter, will generally be formed of from two to four layers.

The wire rope of the present invention represents a new construction in which the lubricant is affixed to the wires and forms an integral part of the rope. In operation of the new wire rope, the strands move over each other in polymer-to-polymer, rather than in metal-to-metal contact. By virtue of the low coefficient of friction of the sintered polymer and its non-self adhering character, frictional wear of the wires is materially reduced and greater flexibility imparted to the rope. The sintered polymer coating not only acts as a dry lubricant and an excellent anti-fretting corrosion agent for the wires of the rope, but also affords protection to the rope against corrosion by moisture, sea water, acidic gases, acids, salt water spray and alkalies, and against abrasion by dust, sand, mud and metal particles. The sintered polymer has low adhesion for solid particles generally. Pick-up and retention of solid particles commonly met with in the use of wire rope is therefore minimized or avoided and the useful life of the rope extended.

The low wettability of the sintered polymer makes the coating highly repellent to water, oil and liquids generally. Coupling the effect of this property with that of the plural layer structure of the thin sintered polymer film on the wires, whereby the second and any succeeding layers of the sintered polymer act to seal-off and reduce the number of pin holes in the first layer, good protection against water reaching the steel or iron of the wire is had. Protection against water-corrosion of steel and iron can be increased by including a suitable anti-rust agent in the thin film of sintered polymer, such as the pigment, chromic acid.

The sintered polymer film has good adhesion to steel and iron wires over a wide range of temperatures, reaching from a sub-zero temperature of −70° F. up to 500° F. Over this same range of temperatures the thin film is flexible and highly resistant to abrasion, cracking and embrittlement and at temperatures up to about 500° F. is characterized by heat resistance and the absence of pronounced softening. A further advantage of the thin sintered polymer film on the wires of the rope is its freedom from solubility in or softening by oils and common solvents. This latter feature of the lubricant film is of importance for the construction of wire rope using a fiber core, e.g. hemp, manila, sisal and jute, since, following the usual practice, the core can be impregnated with lubricating oil without weakening or destroying the sintered polymer film.

The manufacture of wire rope from the sintered polymer coated wire can be carried out in accordance with known practice or in any way found suitable. Coating of the wire with a plural layer thin film of sintered polymer in accordance with the invention can be practiced to advantage for the production of improved ferrous metal wire ropes of various construction whether they have a metallic, fiber or plastic core. The use of the dry lubricant coating in accordance with the invention appears to be of greatest advantage in the manufacture of wire ropes which are provided with a metallic core, e.g., a single wire, wire strand or an independent wire rope (all metal).

For a more complete understanding of the invention and an illustration of improved lubricated wire rope which may be made in accordance therewith, reference is had to the single figure of the accompanying drawing in which there is shown a steel wire rope 1 of known preformed type having a plurality of strands 2 helically wound upon a wire core or center 3. The individual wires 4 of the strands 2 are shown as being coated with a three-layer thin film 5 of sintered polytetrafluoroethylene which contains chromic acid as additional protection against rusting of the steel. The core 3 is a steel wire rope in itself, the individual wires of which are coated in like manner with the sintered polymer containing chromic acid as anti-rust agent.

Coating of the wire with the sintered polymer is accomplished by a series of steps in which the wire is passed through an aqueous suspension of polytetrafluoroethylene, excess suspension removed from the wire, water removed from the wet coating to the extent of an air dry condition whereby to avoid blistering or void formation in the sintered coating, and the air dry coating heated to sintering. These steps are repeated for a succeeding coat or coats of the sintered polymer.

The wire should be clean before entering it into the polymer suspension, i.e., it should be free from oil, grease and dust or other foreign matter which would interfere with adhesion of the polymer suspension to the metal. Cleaning of the wire may be done in any manner found suitable. Ferrous metal wire may be cleaned by a light sand blasting with very fine grit, e.g., No. 80 silica sand followed by washing with a volatile aliphatic hydrocarbon grease solvent, e.g., unleaded gasoline, and drying. In some instances simply washing the wire with a volatile solvent for grease, etc., and drying will suffice for the cleaning of the wire. In other instances heating of the wire to drive off a light lubricant used in drawing of it from the metal stock will suffice to put the wire in the necessary clean condition for coating. Handling of the clean wire should be avoided until after the wet coating of polymer thereon is in an air dry condition since finger marks on the metal prevent adhesion of the polymer suspension thereto.

It is not necessary to remove oxide film from the wire prior to coating. In fact, it is preferably retained since it promotes adhesion of the polymer to the wire. If acid or electrolyte cleaning of the wire be employed, it is recommended that the treated wire be heated at about 700° F. for a time sufficient to drive off occluded gases and form a thin oxide coating on the wire. This treatment will promote excellent adhesion of the polymer to the wire and improve rust protection for steel and iron wire through formation of a sintered polymer coating of reduced porosity.

Polymer suspensions suitable for use in coating the wire for the production of wire rope in accordance with the invention are low viscosity dispersions of colloidal polytetrafluoroethylene in essentially water as the suspending medium. The particle size of the polymer may be on the order of 0.1 micron. A wetting agent is used in the suspensions in small amounts to promote initial dispersion of the polymer particles in the water and to maintain their dispersed condition therein. In addition to the polymer, the aqueous suspensions may contain pigments, notably such as contribute to increase the protection afforded steel and iron against corrosion by water, for example, chromic acid. Aqueous polymer suspensions used for primer coating of the wire, and which may also be used for the succeeding coatings, are highly acidic, the high acidity promoting anchoring of the coating to the metal of the wire. The acidity can be provided by the addition to the aqueous suspensions of a suitable strong acid, e.g., phosphoric acid. Coatings subsequent to the primer coating need not be acidic. Aqueous polytetrafluoroethylene (Teflon) suspensions suitable for use in coating of the wire for the manufacture of wire rope in accordance with the invention are available commercially, or are described in one or more of the following U.S. patents: 2,478,229; 2,562,117 and 2,562,118.

Coating of the wire with sintered polymer can be effected in a continuous operation in which the clean wire is moved vertically and serially through a dilute aqueous highly acidified suspension of the polymer, a draining area, and a furnace for drying and sintering the polymer on the wire.

In this continuous scheme of operation, an elongated vertically disposed tank is partly filled with a dilute highly acidified aqueous suspension of the polymer to leave an overhead space for the purpose of draining the wet coated wire. The concentration of solids in the suspension including any pigment as well as the polymer is kept low in order to obtain a thin coating on the wire as it passes through the suspension. For a sintered coating on the wire of a thickness on the order of .05 to 0.1 mil, a solids concentration in the suspension of from about 10 to 20 percent by weight may be used. The clean wire is moved through an opening in the bottom wall of the tank and after passing through the suspension proceeds upwardly through the space above the suspension to allow the necessary draining of the wet coating on the wire. The extent to which the wet coated wire is drained along with the concentration of the solids in the suspension determines the thickness of the wet polymer coating on the wire and by a proper correlation of these factors, coatings of various desired thicknesses can be obtained. Drainage from the wire can be controlled by relating the rate of movement of the wire with the length of the space above the suspension in the tank, thinner coatings being obtained with more dilute polymer suspensions and a slower rate of movement of the wire through the tank. Dilution of the suspensions can be effected by the addition thereto of distilled water.

The drained wet coated wire in continuous movement passes to and through an elongated vertically disposed furnace which is heated differentially to maintain a temperature gradient therein which rises from the bottom or inlet to the top or outlet. A suitable temperature for the inlet end of the furnace is 600° F. and for the outlet end is 800° F. This differential in heating is calculated to cause the wire to become heated to a temperature of about 750° F., an optimal maximum for sintering of the polymer, just before the wire leaves the furnace. In the initial heating stages of the furnace, the lower temperatures are designed to effect removal of water from the wet coating on the wire in a graduated manner before the coating reaches the sintering temperatures near the outlet of the furnace. The length of the heating space in the furnace and the length of the drainage space in the coating tank are proportioned in relation to each other and in relation to a given rate or rates of travel of the wire therethrough that the desired thickness of sintered polymer coating is obtained on the wire. At a constant rate of travel of the wire of from 20 to 7 feet per minute through the system of coating tank and furnace and using an aqueous suspension of 20 percent solids concentration (15 percent polymer and 5 percent chromic acid) under the heating conditions described above, the wire is supplied with a four layer sintered polymer film of approximately 0.4 mil thickness in a total time of 8 minutes (four complete coating and sintering operations), the rate of travel of the wire being highest for the initial coating and lowest for the last coating. Due to the thermal insulating action of previously applied layer or layers of the sintered polymer a longer time is required to attain to sintering temperatures in the wire for a subsequent layer of the polymer.

Since the invention described herein is obviously applicable to the production of improved lubricated steel and iron wire rope of various constructions, it is to be understood that reference to a particular embodiment of the invention in the foregoing description is to be taken as illustrative and not in limitation except as may be defined in the following claims.

What is claimed is:

1. A wire rope comprising a plurality of ferrous metal multiwire strands laid about a core in which the individual wires of the rope are coated with a plural layer thin film of essentially sintered polytetrafluoroethylene, said film having a thickness of from about 0.1 to 1 mil.

2. A wire rope comprising a plurality of ferrous metal multiwire strands laid about a core in which the individual wires of the rope are coated with a plural layer thin film of essentially sintered polytetrafluoroethylene containing an anti-rust agent, said film having a thickness of from about 0.1 to 1 mil.

3. A wire rope comprising a plurality of ferrous metal multiwire strands laid about a core in which the individual wires of the rope are coated with a plural layer thin film of essentially sintered polyetetrafluoroethylene containing chromic acid as anti-rust agent, said film having a thickness of from about 0.1 to 1 mil.

4. A wire rope comprising a plurality of steel multiwire strands laid about a core in which the individual wires of the rope are coated with a plural layer thin film of essentially sintered polytetrafluoroethylene, said film having a thickness of from about 0.1 to 1 mil.

5. A wire rope comprising a plurality of steel multiwire strands laid about a core in which the individual wires of the rope are coated with a plural layer thin film of essentially sintered polytetrafluoroethylene containing chromic acid as anti-rust agent, said film having a thickness of from about 0.3 to 0.5 mil.

6. A wire rope comprising a plurality of steel multiwire strands laid about a fiber core in which the individual wires of the rope are coated with a plural layer thin film of essentially sintered polytetrafluoroethylene containing chromic acid as anti-rust agent, said film having a thickness of from about 0.1 to 1 mil.

7. A wire rope comprising a plurality of steel multiwire strands laid about a metallic core in which the individual wires of the rope are coated with a plural layer thin film of essentially sintered polytetrafluoroethylene containing chromic acid as anti-rust agent, said film having a thickness of from about 0.1 to 1 mil.

8. A wire rope comprising a plurality of steel multi-wire strands laid about a core in which the individual wires of the rope are coated with a plural layer thin film of essentially sintered polytetrafluoroethylene, each layer in said film having a thickness of not more than about 0.1 mil.

References Cited in the file of this patent

UNITED STATES PATENTS

| | | |
|---|---|---|
| 2,104,667 | Ostrofsky | Jan. 4, 1938 |
| 2,456,621 | Cheney | Dec. 21, 1948 |
| 2,485,019 | Somerville | Oct. 18, 1949 |
| 2,509,894 | Toulmin et al. | May 30, 1950 |
| 2,562,118 | Osdal | July 24, 1951 |
| 2,678,474 | Butler | May 18, 1954 |
| 2,681,324 | Hochberg | June 15, 1954 |
| 2,686,738 | Teeters | Aug. 17, 1954 |
| 2,691,814 | Tait | Oct. 19, 1954 |
| 2,707,703 | Dorst | May 3, 1955 |
| 2,764,782 | Cotchett | Oct. 2, 1956 |
| 2,789,926 | Finholt et al. | Apr. 23, 1957 |
| 2,811,471 | Homeyer | Oct. 29, 1957 |
| 2,825,706 | Sanders | Mar. 4, 1958 |